(No Model.)
E. BARRETT.
PNEUMATIC TIRE.
No. 493,675. Patented Mar. 21, 1893.
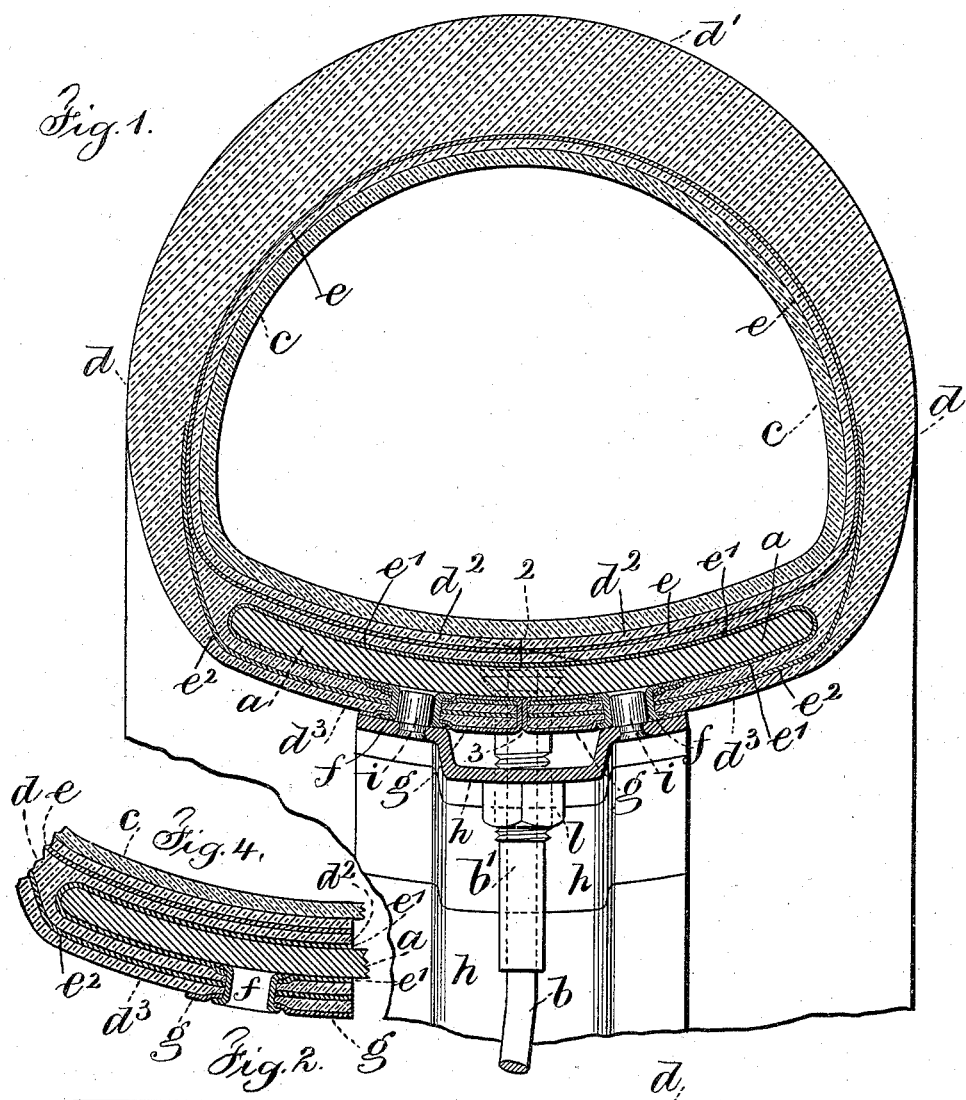
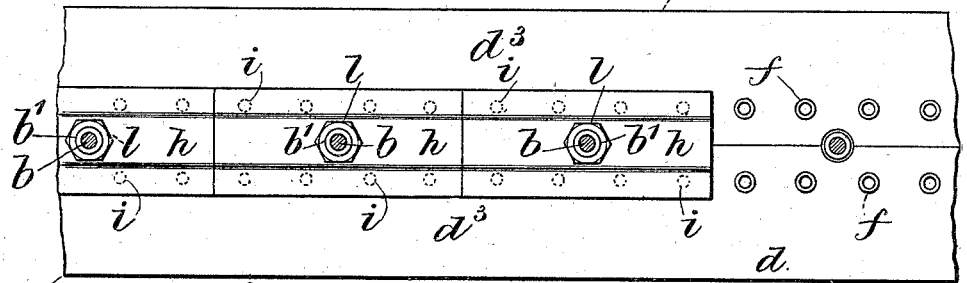

UNITED STATES PATENT OFFICE.

EDWARD BARRETT, OF NEW YORK, N. Y., ASSIGNOR TO HIMSELF AND GEORGE R. BIDWELL, OF SAME PLACE.

PNEUMATIC TIRE.

SPECIFICATION forming part of Letters Patent No. 493,675, dated March 21, 1893.

Application filed January 25, 1892. Serial No. 419,122. (No model.)

*To all whom it may concern:*

Be it known that I, EDWARD BARRETT, a citizen of the United States, residing in the city, county, and State of New York, have invented a new and useful Improvement in Pneumatic Tires for Cycles, of which the following is a specification.

Pneumatic tires of rubber for cycles have heretofore usually been connected to the rim of the wheel by lapping and cementing the parts upon the rim, and when it became necessary to put in a new spoke, or remove the inner air tube for repairs, the lapped and cemented portions had to be entirely or partially separated or torn apart from the rim for this purpose.

The object of my invention is to provide a pneumatic tire that can be readily removed from the rim or felly of the cycle wheel and as readily replaced.

In carrying out my invention I employ a pneumatic tire which is centrally separable at its place of connection with the rim or felly of the wheel, both upon the inside and outside surfaces thereof, and I employ plates of metal and means for securing them to or against the inner surface of the said rim, and connected with said plates of metal are devices for engaging the tire at the meeting edges of its flanges, whereby the same is secured in place upon the rim.

In the drawings Figure 1 is a cross section of a tire and rim showing my improvements. Fig. 2 is a partial plan view of the same, and Figs. 3 and 4 illustrate modifications.

$a$ represents the metal rim of the wheel and $b$ the spokes.

$c$ shows the complete inflatable inner air tube and $d$ the outer tubular rubber covering with a thickened tread portion at $d'$.

Thus far the parts are of usual and well-known construction and do not require further description.

The outer covering $d$ has molded and vulcanized in and with it the strips of fabric $e$, $e'$, $e^2$. The strip $e$ extends entirely around within the outer tire portion $d$; the strips $e'$ encircle the rim or felly $a$ and the strips $e^2$ are laid up against the sides of the strip $e$ and cemented thereto and extend outside the rim and within the portion of the tire that covers the inner surface of the rim $a$. This arrangement of fabric strips imparts strength to the outer tubular covering or tire in a reliable manner.

The inner portion of the outer covering $d$ that comes against the inner portion of the rim or felly $a$ is centrally divided into two flaps $d^2$ upon the line 2 or the inclined dotted line, and the outer portion of the outer covering $d$ that covers the inner surface of the rim or felly is centrally divided into two flaps $d^3$ upon the line 3, which preferably agrees with an imaginary line drawn through the spokes $b$ and spoke nipples $b'$.

The inner air tube $c$ bears against the flaps $d^2$, $d^2$ and is supported by said flaps which come between it and the metal rim or felly $a$ and the outer flaps $d^3$, $d^3$ and the devices connected therewith are the means by which the pneumatic tire is secured to the rim or felly $a$ as hereinafter set forth.

Eyelets $f$ are secured in the flaps $d^3$, $d^3$ at suitable intervals and said eyelets are adjacent to the central meeting edges of said flaps, and I prefer to employ narrow strengthening strips of fabric $g$ upon the flaps $d^3$, $d^3$ along the meeting edges for strengthening the same, and the eyelets $f$ pass through said strips $g$ as shown in Fig. 4, or the said strips $g$ may pass entirely around the meeting edges of the flaps $d^3$, $d^3$, as shown in Fig. 1.

The construction shown in Fig. 4 usually possesses ample strength, and the eyelets as clinched upon the fabric strips $e'$ and $g$ aid in securing the parts. I employ plates of metal $h$, slightly curved to conform to the inner circumference of the rim. These plates are preferably centrally depressed to form edge flanges, and in these flanges are secured pins $i$ at intervals corresponding with the eyelets $f$ in the flaps $d^3$, $d^3$, and these pins enter said eyelets to engage and hold the flaps $d^3$, $d^3$ in place. I prefer these plates to agree in length with the distance between the centers of the spokes and nipples at the rim, and I prefer to thread these plates upon the spokes so that when loosened they may not become lost. I have shown equivalent means of securing the plates $h$ in place and causing them to press down upon the flaps $d^3$, $d^3$.

The spoke nipples $b'$ as shown in Figs. 1 and 2 are externally threaded and clamping nuts $l$ are provided upon the same outside of the plates $h$, and said nuts $l$ serve to clamp and hold down said plates to place. The modification in Fig. 3 shows screws $k$ at the meeting ends of said plates that pass through the flaps $d^3$, $d^3$ at their meeting edges and into the rim $a$ to clamp and hold down said plates to place. In both these instances the plates are shown as meeting between the spokes and as threaded upon said spokes, because I prefer this form of construction, however the said plates might meet on line with the centers of the spokes and be removable, and in this case the nuts $l$ would clamp the meeting ends of two plates.

I claim as my invention—

1. In a pneumatic tire for cycles, the combination with an inner inflatable tube and a wheel rim of an outer tubular covering or tire divided around its inner face into inner and outer pairs of flaps formed of rubber with the outer covering and having the strips of fabric of the outer covering extended within and molded into said flaps, said flaps being adapted to be opened to receive the wheel rim between them and narrow strips of fabric $g$ along the meeting edges of the outer flaps, and eyelets in the outer flaps, and means for engaging the eyelets and securing the tire upon the rim, substantially as specified.

2. In a pneumatic tire for cycles, the combination with an inner inflatable tube and a wheel rim of an outer tubular covering or tire divided around its inner face into inner and outer pairs of flaps formed of rubber with the outer covering and having the strips of fabric of the outer covering extended within and molded into said flaps, said flaps being adapted to be opened to receive the wheel rim between them, and a strip of fabric $e'$ encircling the rim and strips of fabric $g$ extending around the edges of the outer flaps, and eyelets in the outer flaps extending through the same and the strips of fabric and secured thereto, and means for engaging the eyelets and securing the tire upon the rim, substantially as specified.

3. The combination with the rim $a$ and the outer covering or tire $d$ having flaps $d^3$, $d^3$, of the eyelets $f$ secured in said flaps at intervals adjacent to the edges thereof, plates $h$ agreeing in length with the distance between the spoke centers and having pins on their sides to engage the said eyelets and means for clamping and holding the plates, substantially as specified.

4. The combination with the rim $a$ and the outer covering or tire $d$ having flaps $d^3$ $d^3$, of the eyelets $f$ secured in said flaps at intervals adjacent to the edges thereof, plates $h$ agreeing in length with the distance between the spoke centers and having pins $i$ coinciding with and adapted to engage the said eyelets and a clamping device for pressing the plates upon the tire, substantially as set forth.

5. The combination with the tire portion $d$ having flaps $d^3$ $d^3$ and eyelets $f$, of the rim $a$, spokes $b$, nipples $b'$ with exterior screw threads and nuts $l$, the plates $h$ of curved form and centrally depressed and having pins $i$ on their under sides coinciding with the eyelets $f$, the nuts $l$ operating to secure the plates in place, substantially as specified.

Signed by me this 20th day of January, A. D. 1892.

EDWARD BARRETT.

Witnesses:
GEO. T. PINCKNEY,
HAROLD SERRELL.